United States Patent
Seidl

(10) Patent No.: US 10,118,665 B2
(45) Date of Patent: Nov. 6, 2018

(54) PIVOT BEARING

(71) Applicant: Bayerische Motoren Werke Aktiengesellschaft, Munich (DE)

(72) Inventor: Josef Seidl, Dingolfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 258 days.

(21) Appl. No.: 15/003,430

(22) Filed: Jan. 21, 2016

(65) Prior Publication Data

US 2016/0194051 A1 Jul. 7, 2016

Related U.S. Application Data

(63) Continuation of application No. PCT/EP2014/064814, filed on Jul. 10, 2014.

(30) Foreign Application Priority Data

Jul. 25, 2013 (DE) .......................... 10 2013 214 582

(51) Int. Cl.
 B62M 7/00 (2010.01)
 B62K 25/12 (2006.01)
 (Continued)

(52) U.S. Cl.
 CPC .............. B62K 25/12 (2013.01); B62K 25/24 (2013.01); F16C 11/06 (2013.01); F16C 19/545 (2013.01);
 (Continued)

(58) Field of Classification Search
 CPC ........ F16C 19/545; F16C 11/06; B62K 25/12; B62K 25/14
 (Continued)

(56) References Cited

U.S. PATENT DOCUMENTS 4,491,429 A * 1/1985 Matoba .................... B60G 7/00
 267/154
4,512,525 A * 4/1985 Cameron .................. B02C 2/04
 241/207
(Continued)

FOREIGN PATENT DOCUMENTS

CN 1524046 A 8/2004
CN 1538918 A 10/2004
(Continued)

OTHER PUBLICATIONS

International Search Report (PCT/ISA/210) issued in PCT Application No. PCT/EP2014/064814 dated Aug. 22, 2014 with English translation (six pages).
(Continued)

*Primary Examiner* — Tony H Winner
(74) *Attorney, Agent, or Firm* — Crowell & Moring LLP

(57) ABSTRACT

A pivot bearing arrangement, in particular a pivot bearing for a front wheel suspension system of a motorcycle, is provided that substantially reduces bearing breakaway torque, temperature sensitivity, complexity, space requirements and cost. The pivot bearing arrangement includes a first bearing part which enables a component to pivot about a first pivot axis, and a second bearing part which enables a component to pivot about a second pivot axis. The two bearing parts are connected to each other and form a structural unit.

19 Claims, 4 Drawing Sheets

(51) Int. Cl.
  *B62K 25/24* (2006.01)
  *F16C 11/06* (2006.01)
  *F16C 19/54* (2006.01)
  *F16C 19/38* (2006.01)
  *F16C 19/50* (2006.01)

(52) U.S. Cl.
  CPC ............ *F16C 19/386* (2013.01); *F16C 19/50* (2013.01); *F16C 2326/26* (2013.01)

(58) Field of Classification Search
  USPC .................................................. 180/219–231
  See application file for complete search history.

(56) References Cited

U.S. PATENT DOCUMENTS

| | | | | |
|---|---|---|---|---|
| 5,243,873 | A * | 9/1993 | Demers | B25J 17/0275 74/490.06 |
| 7,887,248 | B2 * | 2/2011 | Heath | F16L 3/16 248/276.1 |
| 2002/0151368 | A1 * | 10/2002 | Chang | F16C 11/00 464/114 |
| 2004/0188969 | A1 | 9/2004 | Huhn et al. | |
| 2009/0058040 | A1 | 3/2009 | Woesle et al. | |
| 2011/0012321 | A1 | 1/2011 | Chen | |
| 2015/0274249 | A1 * | 10/2015 | Kuwabara | B62K 21/00 280/276 |
| 2015/0369277 | A1 * | 12/2015 | Fevre | F16D 3/32 403/57 |
| 2016/0252192 | A1 * | 9/2016 | Sheehan | F16C 11/069 |

FOREIGN PATENT DOCUMENTS

| | | |
|---|---|---|
| DE | 37 08 579 A1 | 9/1988 |
| DE | 196 33 692 A1 | 2/1998 |
| DE | 19633692 A1 * | 2/1998 |
| WO | WO 03/011676 A1 | 2/2003 |
| WO | WO 2007/131590 A1 | 11/2007 |

OTHER PUBLICATIONS

German Search Report issued in counterpart German Application No. 10 2013 214 582.9 dated Nov. 3, 2015 with partial English translation (14 pages).

German-language Written Opinion (PCT/ISA/237) issued in PCT Application No. PCT/EP2014/064814 dated Aug. 22, 2014 (five pages).

Chinese-language Office Action issued in counterpart Chinese Application No. 201480041524.3 dated Aug. 1, 2017 with English translation (Seventeen (17) pages).

* cited by examiner

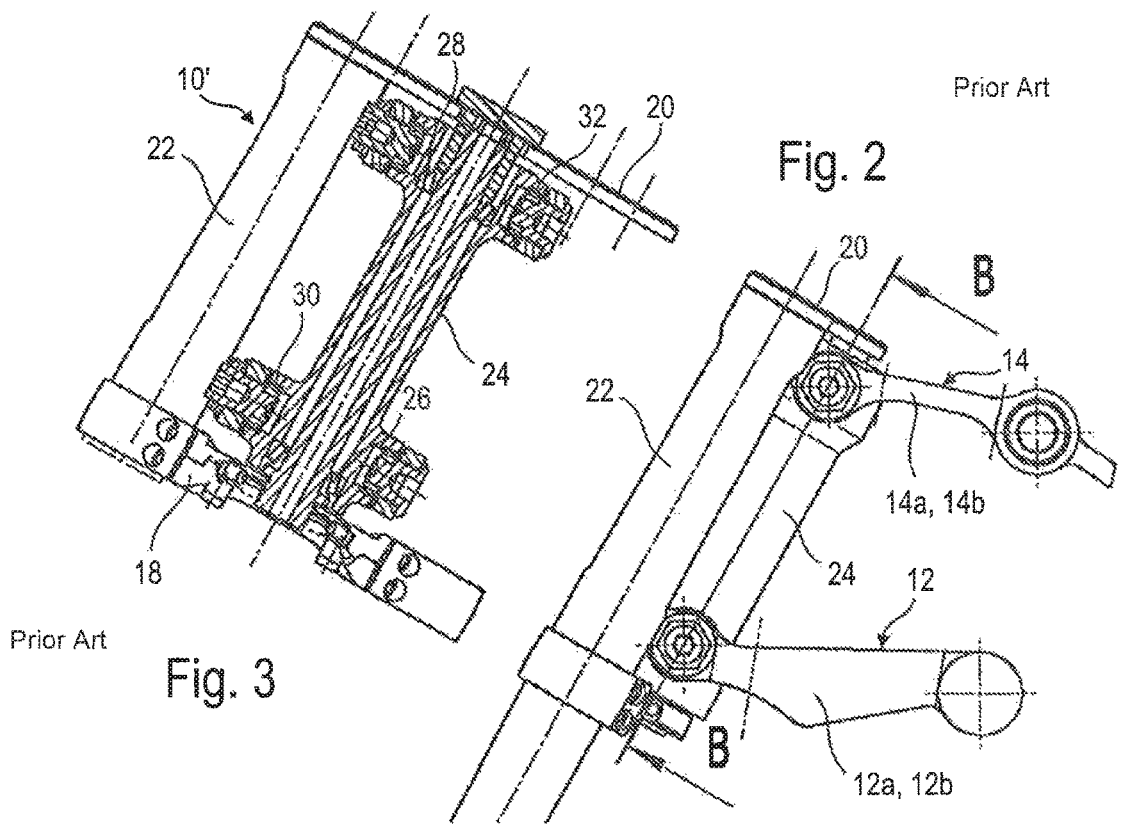
Prior Art
Fig. 2
Prior Art
Fig. 3
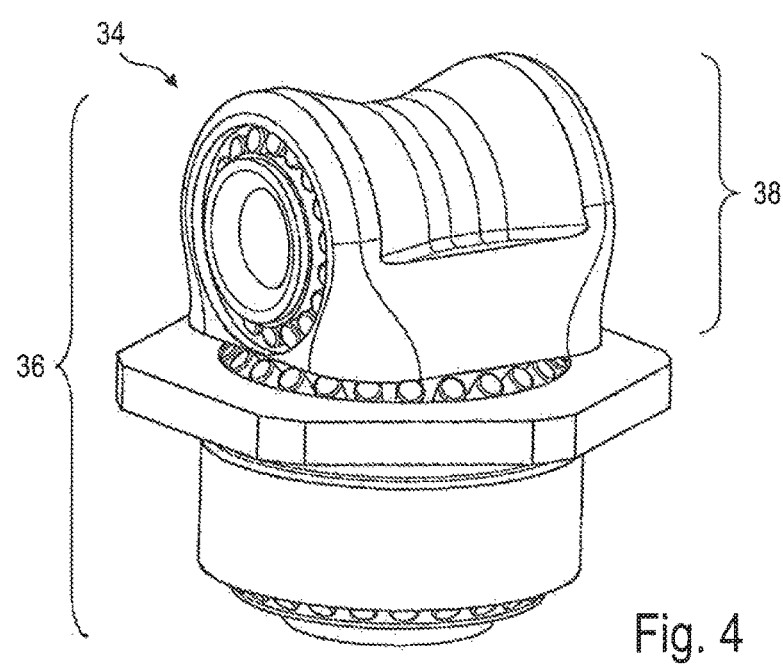
Fig. 4

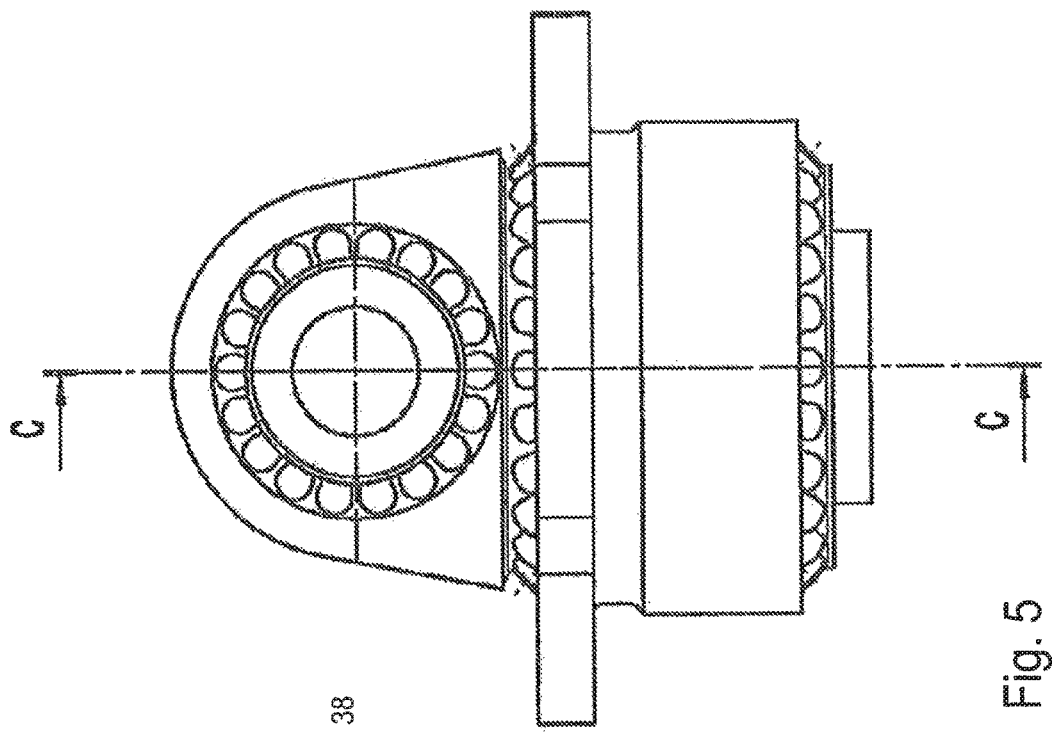
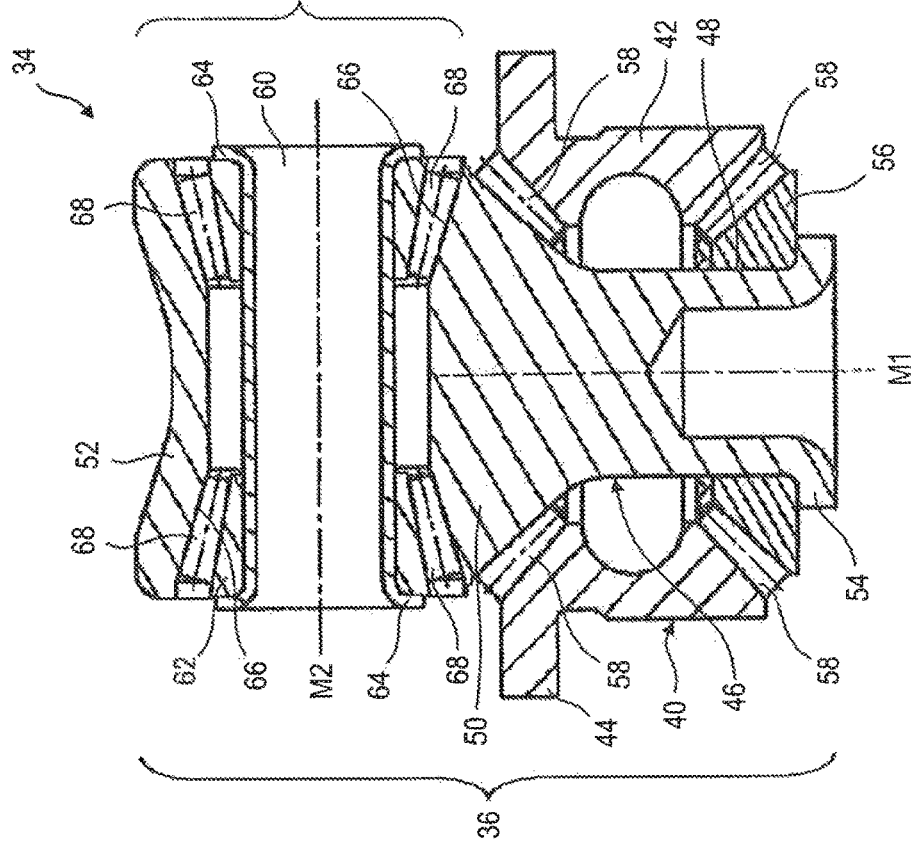
Fig. 5
Fig. 6

PIVOT BEARING

CROSS REFERENCE TO RELATED APPLICATIONS

This application is a continuation of PCT International Application No. PCT/EP2014/064814, filed Jul. 10, 2014, which claims priority under 35 U.S.C. § 119 from German Patent Application No. 10 2013 214 582.9, filed Jul. 25, 2013, the entire disclosures of which are herein expressly incorporated by reference.

BACKGROUND AND SUMMARY OF THE INVENTION

The invention relates to a pivot bearing, in particular for a front wheel suspension system of a motorcycle. The invention furthermore relates to a front wheel suspension system for a motorcycle with such a pivot bearing.

A front wheel suspension system for BMW motorcycles, which has two trailing links arranged one above the other and in each case mounted pivotably on the frame or on the engine housing, is known under the designation "duo lever". The front ends of the trailing links are in each case connected via a ball and socket joint to a fork like wheel carrier which—in contrast to the classic design with two sliding and fixed tubes in each case—is formed as a single part. The suspension and damping are undertaken by a suspension strut which is coupled to the lower of the two trailing links and is supported against the frame. The steering movements triggered by the rider are transmitted to the wheel carrier via a trapezoidal shear joint mounted on the steering head and wheel carrier.

It has already been recognized that ball and socket joints have to overcome a breakaway torque for the transition from static friction into sliding friction. In the case of the previously described "duo lever" front wheel suspension system, this relates to the movement of the wheel carrier and to the steering from a rest position.

As a solution to this problem, it is proposed in International patent document no. WO 2007/131590 A1 not to connect the front ends of the trailing links to the wheel carrier by spherical bearings but rather via pivot bearings in the form of rolling contact bearings, the pivot axes of which run transversely with respect to the longitudinal direction of the motorcycle. Said pivot bearings permit spring movements of the wheel carrier relative to the frame of the motorcycle. The further degree of pivoting freedom required for the steerability of the wheel carrier is achieved by a tube which extends between two transverse connecting elements (fork stabilizers) which connect the fork struts of the wheel carrier. The ends of the tube are each connected to the connecting elements via a pivot bearing. These two steering bearings are also formed by rolling contact bearings, and therefore breakaway torques are very substantially avoided even during the steering of the wheel carrier.

The combination of a plurality of standard rolling contact bearings for providing the required degrees of freedom for the suspension and the steerability of the wheel carrier according to International patent document no. WO 2007/131590 A1, however, requires a large amount of construction space. Further disadvantages are the high weight and the outlay on assembly.

It is an object of the invention to avoid these disadvantages and to permit a compact mounting which is simple to fit and has a plurality of degrees of freedom.

This object is achieved by a pivot bearing, which is provided in particular for a front wheel suspension system of a motorcycle, having a first bearing part which permits a component to pivot about a first pivot axis. The pivot bearing furthermore includes a second bearing part which permits a component to pivot about a second pivot axis, wherein the two pivot axes intersect. The two bearing parts are connected to each other and form a structural unit.

The invention is based on the finding that a combined pivot bearing with intersected pivot axes permits all movements which are required in the suspension and in the steering of the wheel carrier.

Owing to the combining of the two bearing parts to form a structural unit, the pivot bearing according to the invention is easier to handle and also affords logistical advantages in respect of storage and transport.

The pivot bearing according to the invention is suitable in particular for the front wheel suspension system of a motorcycle, particularly for the mounting of the wheel carrier. However, other use possibilities in which pivoting movements having a plurality of degrees of freedom are required are also possible.

According to the preferred embodiment of the invention, the first bearing part and/or the second bearing part have/has at least one rolling contact bearing, in particular a tapered roller bearing. With this bearing arrangement, the substantial problems associated with a ball and socket joint are overcome. In this connection, the breakaway torque which is virtually no longer present (considerably reduced static and also sliding friction) and the significantly lower temperature sensitivity (specifically in the vicinity of the engine) no longer stand in the way of use in chassis and steering system.

A configuration in which two tapered roller bearings which are inclined in relation to each other are fitted in the first bearing part and/or in the second bearing part, in particular in an O arrangement, has proved to be particularly advantageous. This configuration makes it possible to absorb radial and axial loads acting simultaneously ("combined loads").

In the preferred configuration of the pivot bearing according to the invention, the first bearing part has a bearing housing in which a pin is rotatably mounted, and the second bearing part has an outer bearing shell in which a clamping bushing is rotatably mounted, wherein the bearing shell is formed in the pin or by the pin itself. The bearing housing is mounted fixedly in the installed state of the pivot bearing. The particular configuration with the pin which is rotatable in the bearing housing and the clamping bushing which is in turn rotatable in the pin permits a light and compact design of the pivot bearing with few components and which also requires little construction space.

So that the component to be coupled to the pivot bearing according to the invention can be mounted as easily as possible in the clamping bushing, the clamping bushing is preferably arranged in a portion of the pin that protrudes out of the bearing housing, and is therefore easily accessible.

According to an advantageous aspect of the invention, a preferably cylindrical portion of the pin, which portion faces away from the clamping bushing, is hollow, and a free edge of said portion is flanged outward. The hollow design of the pin portion saves weight and facilitates the flanging of the free edge. The flanging itself is advantageously used for fastening an adjacent bearing component, in particular a bearing ring, to the pin. In this case, it is possible to dispense with nuts or screws which cause weight, construction space and costs and have to be secured against release. The flanging therefore permits a saving on weight, cost and construction space and, in addition, increases the functional reliability of the pivot bearing according to the invention.

As already mentioned, a bearing ring which surrounds that portion of the pin which faces away from the clamping bushing can be supported on the flanged edge of the pin, wherein the outside diameter of the bearing ring preferably increases in the direction of the flanged edge. Owing to the flanging, the bearing ring is held securely on the pin.

The bearing ring constitutes a preferably slightly beveled rolling surface for first rolling contact bodies of the first bearing part, which rolling contact bodies are arranged between the bearing housing, on the one hand, and the bearing ring, on the other hand.

An arrangement, which is matched thereto, of a further tapered roller bearing is achieved by a configuration in which the pin has an intermediate portion which faces the clamping bushing and the outside diameter of which preferably increases in the direction of the clamping bushing, wherein first rolling contact bodies of the first bearing part are arranged between said intermediate portion and the bearing housing.

In a particularly compact configuration of the pivot bearing according to the invention, the pin has a cavity into which the clamping bushing is fitted, wherein second rolling contact bodies of the second bearing part are arranged between a wall of the cavity and the clamping bushing.

For an obliquely inclined second tapered roller bearing, the second rolling contact bodies rest on at least one ring surface of the cavity wall, the center axis of which runs parallel to the second pivot axis, wherein the ring surface or the ring surfaces is or are inclined relative to the second pivot axis.

In the preferred embodiment of the pivot bearing, the second rolling contact bodies rest on at least one inner ring which is coupled to the clamping bushing for rotation therewith. The clamping bushing together with the inner ring forms the inner part of a rolling contact bearing, which inner part is rotatable relative to the outer bearing shell.

According to a particularly advantageous aspect of the invention, at least one free edge of the clamping bushing is flanged outward, and a respective inner ring is supported on the one or two flanged edges of the clamping bushing, the outside diameter of which inner ring preferably increasing in the direction of the associated free edge of the clamping bushing. The hollow clamping bushing makes it possible in a simple manner to accommodate a component to be mounted, wherein the flanging can advantageously be used for fastening at least one inner ring to the clamping bushing. Owing to the flanging, the inner ring is held securely on the clamping bushing. In this case, it is possible to dispense with nuts or screws which cause weight, construction space and costs and have to be secured against release. The flanging therefore provides a saving on weight, cost and construction space and, in addition, increases the functional reliability of the pivot bearing according to the invention. The frustoconical shape of the inner ring is of importance for the configuration as an obliquely inclined tapered roller bearing.

In order to permit or at least to support a defined axial prestressing of the second rolling contact bodies, according to a development of the invention a spacer ring which surrounds the clamping bushing is arranged between the two inner rings.

The invention also provides a front wheel suspension system for a motorcycle, comprising a wheel carrier and trailing links or transverse links which connect the wheel carrier to a supporting component of the motorcycle, in particular to a motorcycle frame or an engine housing. The trailing links or transverse links are in each case connected by a pivot bearing of the type described previously to the wheel carrier.

Furthermore, the invention provides a front wheel suspension system for a motorcycle, comprising a wheel carrier in the form of a telescopic fork. At least one bearing point between a supporting component of the motorcycle, in particular a motorcycle frame or an engine housing, and the wheel carrier is formed by a pivot bearing of the type described previously.

With regard to the advantages of the front wheel suspension systems according to the invention, reference is made to the statements above regarding the advantages of the pivot bearing according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a detail of a different front wheel suspension system according to the prior art in side view;

FIG. 3 shows a sectional view along the line B-B in FIG. 2;

FIG. 4 shows a perspective view of a pivot bearing according to an embodiment of the present invention;

FIG. 5 shows a side view of the pivot bearing from FIG. 4;

FIG. 6 shows a sectional view along the line C-C in FIG. 5; and

DETAILED DESCRIPTION OF THE DRAWINGS

Figure 1:
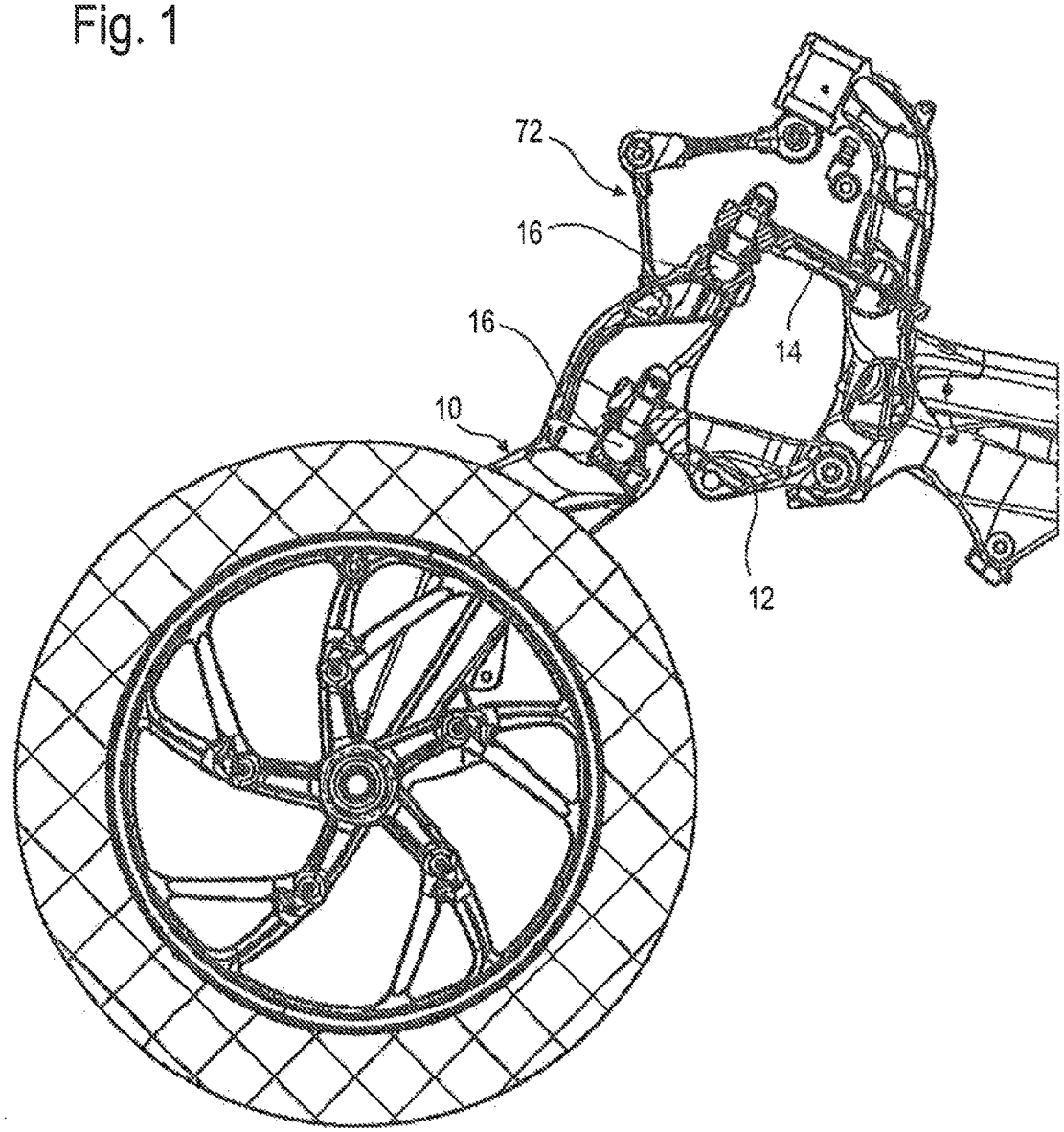
FIG. 1 shows a sectioned side view of a front wheel suspension system of a motorcycle according to the prior art.

FIG. 1 illustrates a known motorcycle front wheel suspension system of the "duo lever" type. A wheel carrier 10, which is formed here as a single-part wheel carrier in the form of a casting with a central suspension strut (not shown here) for suspension, is mounted on the motorcycle frame and/or on the engine housing of the motorcycle by a lower trailing link 12 and an upper trailing link 14, wherein the front ends of the trailing links 12, 14 are connected to the wheel carrier 10 via ball and socket joints 16.

The prior art front wheel suspension system shown in FIGS. 2 and 3 has a fork-like wheel carrier 10' with a lower fork stabilizer 18 and an upper fork stabilizer 20, which connect together two fork arms 22, of which only the left one is shown here. As in the previously described embodiment, the wheel carrier 10' is mounted on the motorcycle frame by a lower trailing link 12 and an upper trailing link 14. Each of the two trailing links 12, 14 has a left trailing link arm 12a and 14a, respectively, and a right trailing link arm 12b and 14b, respectively, of which only the left in each case can be seen in FIG. 2.

A head tube 24 extends between the lower fork stabilizer 18 and the upper fork stabilizer 20. A lower end of the head tube 24 is connected to the lower fork stabilizer 18 via a first rolling contact bearing 26. In a corresponding manner, an upper end of the head tube 24 is connected to the upper fork stabilizer 20 via a second rolling contact bearing 28. The first and second rolling contact bearings 26, 28 are arranged coaxially and serve as steering bearings. Front ends of the trailing link arms 12a, 12b and 14a, 14b are connected in an articulated manner to the head tube in each case via a lower, third rolling contact bearing 30 and an upper, fourth rolling contact bearing 32. The third and fourth rolling contact bearings 30, 32 permit spring movements of the wheel carrier 10' with respect to the frame of the motorcycle.

A pivot bearing according to the invention which can replace a respective ball and socket joint 16 or in each case two lower rolling contact bearings 26 and 30 or two upper rolling contact bearings 28 and 32 in the previously described front wheel suspension systems, will now be described below.

The pivot bearing 34 shown in FIGS. 4 to 6 is a combined pivot bearing with a first bearing part 36 and a second bearing part 38. For the sake of simplicity, the pivot bearing 34 is illustrated without any sealing.

The first bearing part 36 comprises a bearing housing 40 with a substantially cylindrical housing portion 42 and a radially protruding collar 44, which are provided for the fixed installation of the first bearing part 36.

A pin 46 which is generally rotationally symmetrical with respect to the center axis M1 thereof is accommodated centrally in the bearing housing 40. The pin 46 has a cylindrical lower portion 48 which merges into an intermediate portion 50, which widens continuously in diameter. The intermediate portion 50 is adjoined by an upper pin portion 52 which is, in turn, substantially cylindrical.

The lower portion 48 of the pin 46 has a free edge 54 and can be of hollow design for weight reasons and in order to facilitate flanging of the free edge 54. The lower end of the pin 46 is surrounded by a bearing ring 58, the outside diameter of which is reduced upward. The bearing ring 58 therefore has a frustoconical shape. The free lower edge 54 of the pin 46 is flanged outward, and therefore the bearing ring 58 is held fixedly on the pin 46. Further fastening for holding the bearing ring 58 on the pin 46 is not provided at this point.

The shape of the bearing housing 40 is matched to the geometry of the bearing ring 58 and of the intermediate portion 50 of the pin 46. A plurality of first rolling contact bodies 56 in the form of frustoconical or cylindrical rollers are arranged distributed over the circumference between the bearing ring 58 and the bearing housing portion opposite the latter, and also between the intermediate portion 50 of the pin 46 and the bearing housing portion opposite the latter. The rotation axes of the first rolling contact bodies 56 are inclined in relation to the center axis M1 of the pin 46.

This construction of the first bearing part 36 corresponds to that of two tapered roller bearings which are inclined in relation to each other, are mounted in an O-arrangement and permit the pin 46 (including the bearing ring 58) to rotate about the center axis M1 of the pin 46 relative to the bearing housing 40. The axis M1 therefore constitutes the pivot axis of the first bearing part 36.

The second bearing part 38 is formed in the upper pin portion 52 and comprises a clamping bushing 60 which is mounted therein so as to be rotatable about the center axis M2 thereof and serves for accommodating a component which is to be mounted. For this purpose, the upper pin portion 52 is provided with a cavity which extends completely through the upper pin portion 52 transversely with respect to the axis M1. The clamping bushing 60 which, together with two inner rings 62, forms the internal part of a rolling contact bearing, is fitted into the cavity.

In order to hold the two inner rings 62 fixedly on the clamping bushing 60, the edges 64 of the free ends of the clamping bushing 60 are flanged outward. Further fastening for holding the inner rings 62 on the clamping bushing 60 is not provided at this point.

The outside diameter of the two axially spaced-apart inner rings 62 decreases from the outside inward, and therefore the two inner rings 62, in a similar manner to the bearing ring 58 of the first bearing part 36, have a frustoconical shape.

The cavity in the upper pin portion 52 has two ring surfaces 66 which lie opposite the inner rings 62 and are coordinated therewith. The center axis of the ring surfaces 66 is parallel to the center axis M1 of the pin 46, in more precise terms, coincides therewith. The ring surfaces 66 are inclined with respect to the axis M2, wherein the distance of the ring surfaces 66 from the axis M2 increases in each case in the direction of the flanged edges 64 of the clamping bushing 60.

Second rolling contact bodies 68 in the form of frustoconical or cylindrical rollers rest on the inner rings 62 in a manner distributed over the circumference and are supported against the ring surfaces 66 of the pin 46. The rotation axes of the second rolling contact bodies 68 are in turn inclined in relation to the center axis M2 of the clamping bushing 60.

The construction of the second bearing part 38 therefore likewise corresponds to that of two tapered roller bearings which are inclined in relation to each other and are mounted in an O-arrangement. Owing to the second rolling contact bodies 68, the clamping bushing 60 (including the inner rings 62) can rotate about the center axis M2 thereof relative to the pin 46 of the first bearing part 36, which pin serves as the outer bearing shell. The axis M2 therefore constitutes the pivot axis of the second bearing part 38.

The outer bearing shell of the second bearing part 38 is formed by the pin 46, in more precise terms by the upper pin portion 52, of the first bearing part 36, and therefore a structural unit of the two bearing parts 36, 38 is produced.

As can be seen in FIG. 6, the pivot axes M1 and M2 of the two bearing parts 36, 38 intersect at right angles.

Figure 7:
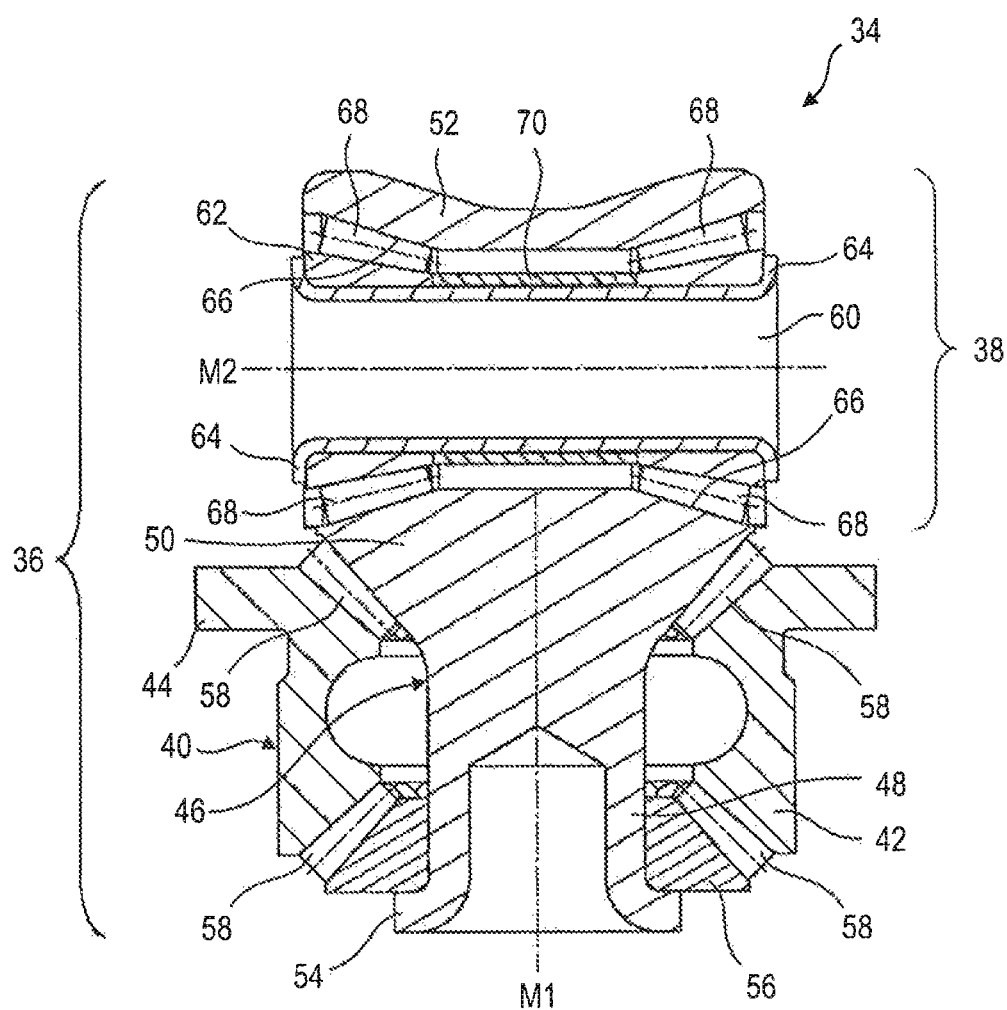
FIG. 7 shows a sectional view corresponding to FIG. 6 of another embodiment of the pivot bearing according to the present invention.

FIG. 7 shows a variant of the pivot bearing 34 according to the invention. A spacer ring 70 surrounding the clamping bushing 60 is arranged in the second bearing part 38 between the two inner rings 62. The spacer ring 70 maintains the axial prestressing of the second rolling contact bodies 68 irrespective of the tension force of the flanging and the tension force of the fastening elements.

The location at which the ball and socket joints 16 are arranged in FIG. 1, i.e. between wheel carrier 10 and trailing or transverse links 12, 14, is provided as the installation site for the combined pivot bearing 34. The pivot bearing 34 therefore connects wheel carrier 10 and trailing or transverse links 12, 14 and permits both wheel travel movements and steering movements in a single-part wheel carrier which is designed, for example, in the form of a casting with a suspension strut.

The combined pivot bearing 34 can also be used in the case of two-wheeled vehicles having a conventional telescopic fork with two fixed and two sliding tubes. Said pivot bearing then replaces the upper or lower bearing in the steering head. The otherwise customary adjustment of the steering head bearings is therefore omitted.

The combined pivot bearing 34 can be used in the same manner in the steering linkage 72 of a front wheel suspension system (see FIG. 1).

In principle, the pivot bearing 34 according to the invention can be used wherever a pivoting movement with a plurality of degrees of freedom is required.

LIST OF REFERENCE NUMBERS

10, 10' Wheel carrier
12 Lower trailing link

12a Left trailing link arm of the lower trailing link
12b Right trailing link arm of the lower trailing link
14 Upper trailing link
14a Left trailing link arm of the upper trailing link
14b Right trailing link arm of the upper trailing link
16 Ball and socket joint
18 Lower fork stabilizer
20 Upper fork stabilizer
22 Fork arm
24 Head tube
26 First rolling contact bearing
28 Second rolling contact bearing
30 Third rolling contact bearing
32 Fourth rolling contact bearing
34 Pivot bearing
36 First bearing part
38 Second bearing part
40 Bearing housing
42 Cylindrical housing portion
44 Collar
46 Pin
48 Lower pin portion
50 Intermediate portion
52 Upper pin portion
54 Lower edge of the pin
56 Bearing ring
58 First rolling contact body
60 Clamping bushing
62 Inner ring
64 Free edge of the clamping bushing
66 Ring surface
68 Second rolling contact body
70 Spacer ring
72 Steering linkage The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pivot bearing for a front wheel suspension system of a motorcycle, comprising:
   a first bearing part configured to permit a first component supported thereon to pivot about a first pivot axis; and
   a second bearing part which permits a second component supported thereon to pivot about a second pivot axis, wherein
      the first and second pivot axes intersect,
      the second bearing part has an axial length centered on the first pivot axis, and
      the first and second bearing parts are coupled to form a structural unit.

2. The pivot bearing as claimed in claim 1, wherein at least one of the first bearing part and the second bearing part include at least one rolling contact bearing.

3. The pivot bearing as claimed in claim 2, wherein the at least one rolling contact bearing is a tapered roller bearing.

4. The pivot bearing as claimed in claim 2, wherein the at least one rolling contact bearing includes at least two tapered roller bearings,
   a pair of the at least two tapered roller bearings is located on at least one of the first bearing part and the second bearing part, and
   the pair of the at least two tapered roller bearings is arranged in inclined relation to one another on a common one of the first or second pivot axes.

5. The pivot bearing as claimed in claim 4, wherein
   the first bearing part includes a bearing housing in which a pin is rotatably mounted co-axially with the first pivot axis,
   the second bearing part includes an outer bearing shell in which a clamping bushing is rotatably mounted co-axially with the second pivot axis, and
   the outer bearing shell is formed at least one of coupled to and integral with the pin.

6. The pivot bearing as claimed in claim 5, wherein
   a cylindrical portion of the pin facing away from the clamping bushing is hollow and includes a free edge flanged radially outward.

7. The pivot bearing as claimed in claim 5, wherein
   the clamping bushing is arranged in a portion of the pin that protrudes out of the bearing housing.

8. The pivot bearing as claimed in claim 6, wherein
   a cylindrical portion of the pin facing away from the clamping bushing is hollow and includes a free edge flanged radially outward.

9. The pivot bearing as claimed in claim 8, further comprising:
   a first bearing ring, the first bearing ring surrounding at portion of the cylindrical portion of the pin and being supported on the flanged free edge of the pin,
   wherein an outside diameter of the first bearing ring increases in a direction along the first pivot axis toward the flanged free edge.

10. The pivot bearing as claimed in claim 9, wherein
    first rolling contact bodies of the first bearing part are arranged between the bearing housing and the first bearing ring.

11. The pivot bearing as claimed in claim 10, wherein
    the pin includes an intermediate portion facing the clamping bushing,
    an outside diameter of the intermediate portion increases in a direction along the first pivot axis toward the clamping bushing, and
    further first rolling contact bodies of the first bearing part are arranged between the intermediate portion and the bearing housing.

12. The pivot bearing as claimed in claim 11, wherein
    the pin includes a cavity arranged to receive the clamping bushing co-axially along the second pivot axis, and
    second rolling contact bodies of the second bearing part are arranged between a wall of the cavity and the clamping bushing.

13. The pivot bearing as claimed in claim 12, further comprising:
    at least one second bearing ring surrounding the clamping bushing,
    wherein
       the at least one second bearing ring is inclined relative to the second pivot axis, and
       the second rolling contact bodies rest on at least one ring surface of the cavity wall.

14. The pivot bearing as claimed in claim 13, wherein
    at least one free edge of the clamping bushing is flanged radially outward,
    a respective one of the at least one second bearing ring is supported on each of the at least one flanged free edge of the clamping bushing, and an outside diameter of each of the at least one second bearing ring increased in a direction along the second pivot axis toward the respective flanged free edge of the clamping bushing.

15. The pivot bearing as claimed in claim 14, further comprising:
a spacer ring surrounding the clamping bushing,
wherein
the at least one second bearing ring includes two second bearing rings located at opposite ends of the clamping bushing, and
the spacer ring is located axially between the two second bearing rings and is configured to axially prestress the second rolling contact bodies located between the two second bearing rings and respective adjacent portions of the wall of the cavity.

16. A front wheel suspension system for a motorcycle, comprising:
a wheel carrier;
at least one of trailing and transverse links arranged to connect the wheel carrier to a supporting structure of the motorcycle; and
at least one pivot bearing coupling the wheel carrier at least one of the at least one of trailing and transverse links,
the at least one pivot bearing includes a first bearing part configured to permit a first component supported thereon to pivot about a first pivot axis and a second bearing part (38) which permits a second component supported thereon to pivot about a second pivot axis, the first and second pivot axes intersect,
the second bearing part has an axial length centered on the first pivot axis, and
the first and second bearing parts are coupled to form a structural unit.

17. The front wheel suspension system as claimed in claim 16, wherein
the supporting structure of the motorcycle is at least one of a motorcycle frame and an engine housing.

18. A front wheel suspension system for a motorcycle, comprising:
a wheel carrier in a form of a telescopic fork; and
at least one pivot bearing coupling the wheel carrier to a supporting structure of the motorcycle,
wherein
the at least one pivot bearing includes a first bearing part configured to permit a first component supported thereon to pivot about a first pivot axis and a second bearing part (38) which permits a second component supported thereon to pivot about a second pivot axis, the first and second pivot axes intersect,
the second bearing part has an axial length centered on the first pivot axis, and
the first and second bearing parts are coupled to form a structural unit.

19. The front wheel suspension system as claimed in claim 18, wherein
the supporting structure of the motorcycle is at least one of a motorcycle frame and an engine housing.

\* \* \* \* \*